Feb. 16, 1932.     W. LA HODNY     1,845,090
MIRROR BRACKET
Filed Jan. 10, 1929
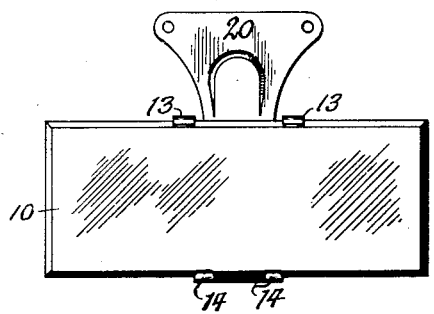
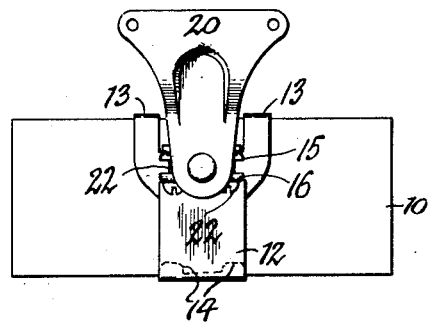
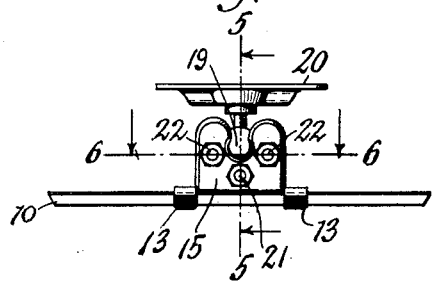
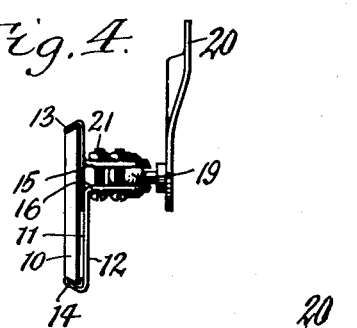
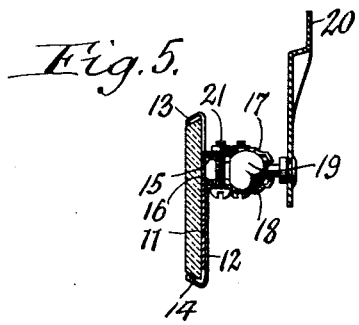
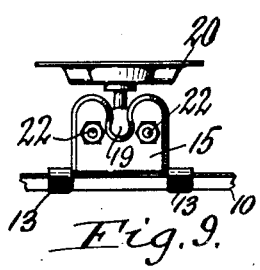
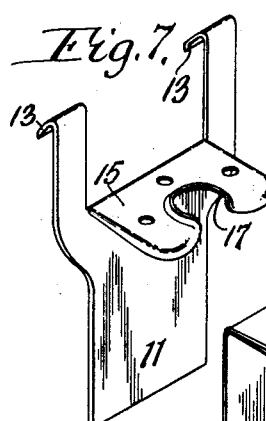
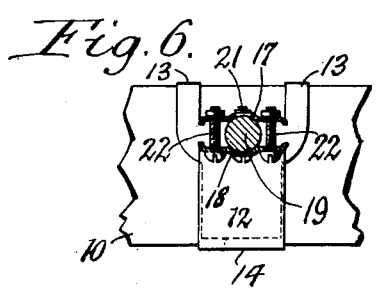
Inventor
William La Hodny
By Popper Powers
Attorneys Patented Feb. 16, 1932

1,845,090

UNITED STATES PATENT OFFICE

WILLIAM LA HODNY, OF BUFFALO, NEW YORK, ASSIGNOR TO STANDARD MIRROR COMPANY INC., OF BUFFALO, NEW YORK, A CORPORATION OF NEW YORK

MIRROR BRACKET

Application filed January 10, 1929. Serial No. 331,514.

This invention relates to a bracket which is more particularly intended for supporting a mirror on an automobile so as to permit its occupants to obtain a view of the road in rear of the car.

It is the purpose of this invention to provide a bracket of this character which is comparatively simple and durable in construction, and readily adjustable into various angles, and which upon being applied to a mirror will not mark the same on the back to such an extent that such marking is visible on the front of the mirror.

In the accompanying drawing:

Figure 1 is a front elevation of a mirror mounted on my improved bracket.

Figure 2 is a rear elevation of the same.

Figure 3 is a top plan view thereof.

Figure 4 is an end view of the same.

Figure 5 is a vertical transverse section taken on line 5—5 Fig. 3.

Figure 6 is a vertical longitudinal section taken on line 6—6 Fig. 3.

Figures 7 and 8 are perspective views of the two sections of the head of the bracket.

Figure 9 is a plan view showing a slightly modified form of my invention.

In the following description similar characters of reference indicate like parts in the several figures of the drawing.

In its general organization this bracket comprises a head adapted to carry the mirror 10 which is to be mounted, a hanger adapted to be attached to a support such as the windshield of an automobile, and a frictional connection between said hanger and head whereby the mirror may be swiveled or turned into various angular positions relative to the support as best suits the person using the mirror.

The mirror shown in the drawing is of oblong rectangular form but if desired the same may be of any other suitable shape.

The carrying head of the bracket is made of two sections of sheet metal forming two plates 11, 12 which are arranged in rear of the mirror and which have their inner end portions overlapping one another. The underplate 11 extends nearly across the entire width of the mirror and is provided at its outer edge with two spaced apart claws or hooks 13 which engage forwardly over one of the horizontal longitudinal edges of the mirror. The over plate 12 is provided at its outer edge with one or more hooks 14 which engage forwardly under the opposite horizontal longitudinal edge of the mirror.

Between the two claws 13 the under plate is provided with a rearwardly projecting wing 15 and at the inner edge of the cover plate 12 the same is provided with a rearwardly projecting wing 16.

The opposing surfaces of the rear parts of the wings are formed into two spherical seat sections 17, 18 which together constitute a ball socket which receives a ball 19 forming part of a swiveling frictional joint. This ball projects forwardly from one end of a hanger 20 which is adapted to be secured to a windshield or other support by screws passing through holes in the hanger or in any other suitable manner.

As shown in Figs. 3, 4 and 5 the over and under plates are drawn inwardly in a direction across the back of the mirror by a clamping bolt 21 connecting the wings 15, 16 between the plates and the ball seats 17, 18. The latter are drawn against opposite sides of the ball by two clamping bolts 22 passing through the wings on opposite sides of the ball and seats and on a longitudinal line passing through the axis of the same.

By tightening the bolt 21 the plates of the supporting head are securely fastened to the mirror and, by tightening the bolts 22 more or less, the frictional grip of the seats of the wings against opposite sides of the ball may be so determined that the mirror can be readily turned into the desired angular position and be reliably held in this position after adjustment.

If desired, the clamping bolt 21 may be omitted, as shown in Fig. 9, in which case the bolts 22 perform the dual function of drawing the hooks of the head plates against opposite edges of the mirror and also pressing the wings of the plates against opposite sides of the ball.

By extending the plate 11 practically across the entire back of the mirror a comparatively large bearing surface for this plate is provided whereby the latter is prevented from detenting or marring the reflecting coating on the rear side of the mirror upon drawing the wing of this plate inwardly for clamping the mirror and ball, which detenting or marring would be visible on the front side of the mirror and render the same unsightly.

Inasmuch as the cover plate 12 of the head rests against the under plate 11 tipping of the wing on the cover plate while tightening the clamping bolts cannot disfigure the back of the mirror coating.

Heretofore inserts of paper or other cushioning sheets have been placed between the rear of the mirror and the bracket in order to protect the reflecting coating against injury, but such inserts were liable to escape and leave the mirror unprotected. In the present case such inserts are not required thereby preserving the mirror coating against mutilation during assembling, shipping and using without any added cost.

I claim as my invention:

A mirror supporting bracket comprising upper and lower plates adapted to be arranged in rear of a mirror and having their inner ends overlapping one another so that one of these plates engages with the rear side of the mirror, the upper plate being provided at its upper end with two spaced-apart claws which are adapted to engage with the upper edge of the mirror, and said lower plate being provided at its lower end with a claw which is adapted to engage with the lower edge of the mirror, said upper plate being provided at its upper edge between the claws thereof with a rearwardly turned wing and said lower plate being provided at its inner end with a rearwardly turned wing which is arranged below the wing of the upper plate, said wings having their opposing rear parts constructed to form two opposing spherical socket sections, a hanger having a ball arranged between said socket sections, and clamping screws connecting said wings around said ball and operating to draw said wings against opposite sides of said ball and also shift said plates for drawing the claws thereof against opposite edges of said mirror.

In testimony whereof I, hereby affix my signature.

WILLIAM LA HODNY.